United States Patent [19]

Schäfer

[11] 4,213,153
[45] Jul. 15, 1980

[54] PROCESS FOR THE OPTICAL DISPLAY OF INFORMATION USING LASERS

[75] Inventor: Fritz P. Schäfer, Göttingen-Nikolausberg, Fed. Rep. of Germany

[73] Assignee: Max-Planck-Gesellschaft zur Fördenberg der Wissenschaften E.V., Göttingen, Fed. Rep. of Germany

[21] Appl. No.: 934,245

[22] Filed: Aug. 16, 1978

[30] Foreign Application Priority Data

Aug. 30, 1977 [DE] Fed. Rep. of Germany ....... 2739081

[51] Int. Cl.$^2$ .......................... H04N 5/66; H04N 9/12
[52] U.S. Cl. ...................... 358/231; 358/60; 358/59; 250/365; 250/372
[58] Field of Search ............... 340/700, 705; 250/336, 250/361 R, 365, 372; 358/56, 59, 60, 230, 231, 241; 331/94.5 K; 332/7.51; 350/354

[56] References Cited

PUBLICATIONS

Applied Optics, vol. 10 #1, Jan. 1971, pp. 150-152, 154-160.

Primary Examiner—Robert L. Richardson
Attorney, Agent, or Firm—Sprung, Felfe, Horn, Lynch & Kramer

[57] ABSTRACT

A display process for the optical presentation of information which process comprises impinging laser beams modulated as to their direction, intensity and/or frequency, upon a transparent target containing a fluorescent substance which is excited by said laser beams to optical fluorescence, e.g., which absorbs in the ultraviolet range and yields fluorescent radiation in the visible range; typical ions capable of fluorescence are uranyl ions or ions of the rare earth elements.

23 Claims, No Drawings

PROCESS FOR THE OPTICAL DISPLAY OF INFORMATION USING LASERS

The invention relates to a process for the optical display of information.

The term "display" as used herein is used, as is in general parlance at the present time, to refer to a controllable optical display of aphanumerical or pictorial information.

A number of systems or apparatus are known which are suitable for display processes. First they can be classified according to whether they are primary light sources or whether they operate instead by reflected or ambient light. The first class includes, for example, the display means using light emitting diodes (LED), such as are usually to be found as alphanumerical read-out units of pocket calculators, or television picture tubes with their modulating unit for the production of a television picture. The second class includes, for example, liquid crystal displays, which are often found in digital watches, or the enlarged projection of a television picture onto a motion picture screen by a number of known methods.

"The Bell System Technical Journal", Vol. 56, No. 3 (March 1977), p. 367, discloses transparent display systems for computer applications, which operate on the basis of semi-transparent mirrors.

There are different applications for the various display devices according to their greatly differing physical properties as well as the differences in cost of procurement and operation. There are other important applications for which none of the previously known processes are suitable. For example, no process is known which makes it possible to produce self-illuminated information patterns, such as pictures of instrument readings, distance readings, etc., on a clear, transparent plate, such as for example the windshield of manned aircraft and other windows of stationary or moving apparatus, such as the windshields of motor vehicles in the broadest sense, etc., without simultaneously impairing the transparency of the window.

The present invention comprises a process which makes it possible to solve problems such as those set forth above in widely varying embodiments and to produce any desired information pattern without impairing the transparency of viewing windows.

This problem is solved by the display process of the invention for the optical presentation of information. Essentially, the process comprises impinging laser beams, which are modulated in their intensity and/or their frequency upon a transparent target which contains fluorescent substances which are excited to optical fluorescence by the laser beams.

The term target, as used herein, is to be understood to refer to a means on which the optical display is produced when it is struck by the laser beams, and hence to the carrier of the information.

In the display process of the invention, a fluorescent display is produced in, on or behind a thin, transparent sheet or film of glass or plastic, or a layer of liquid situated between two such sheets or films (hereinafter also referred to as targets) by means of one or more laser beams which are modulated as to their direction, intensity and/or frequency in relation to the display to be produced. That is to say, the laser beam, which is shifted and/or intensity modulated and/or frequency modulated in correlation with the display pattern that is to be produced, is made to impinge upon a target where a fluorescent substance is excited by the impinging light of the laser beam, so that a visible pattern is there produced corresponding to the information.

It is best to use laser beams having a wavelength in the ultraviolet range, since then the invisible laser beams cannot interfere with the desired optical impression. This cannot be accomplished in the desired manner with visible light rays on account of the scattering action produced on dust particles and surfaces, which can never be entirely avoided.

The modulation of the light beam with regard to its movement, intensity and/or frequency is known. Thus the guidance and the intensity modulation of the laser beam can be accomplished by known methods in many ways, such as the line scanning method used in television. See, in this connection, R. T. Denton, "Modulation Techniques," Laser Handbook, published by F. T. Arecchi and E. O. Schulz-Dubois, North-Holland Publishing Company, Amsterdam, Vol. 1 (1972) pp. 703 to 724. The electro-optical deflection of laser beams has been described by U. J. Schmidt in "Electro-optic deflection of a laser beam," Philips Technical Review, Vol. 36, No. 5 (1976), page 117.

For the excitation of the different fluorescences, a variety of fixed-frequency lasers or even only one frequency-variable laser with appropriate wavelength modulation can be used, the selection being made on the basis of expediency in conjunction with the circumstances of the particular application.

In accordance with the invention, thin, transparent sheets, films or layers of liquid are used as targets. The sheets or films can be made of glass or plastic, and the liquid layer can be placed between two such sheets. It is desirable that these sheets, films or liquid layers be able to absorb as little as possible of the light of the laser beam used. The targets can be, for example, sheets of inorganic glass containing ions whose fluorescence can be excited by ultraviolet laser beams, such as uranyl ions, or ions of various rare earths, such as lanthanum ions, erbium ions, neodymium ions, praseodymium ions, europium ions, cerium ions, terbium ions, samarium ions and gadolinium ions. The films or sheets can be made of a variety of plastic materials, for example, in which fluorescent dyes are incorporated by polymerization, tinting or other known methods; the film should, again, have an absorption as low as possible at the wavelengths of the ultraviolet laser beams. The target can also be a layer of liquid sandwiched between two transparent sheets or films and containing suitable fluorescent substances. By the appropriate selection of the fluorescent ions or dyes and by the proper selection of their concentration it can easily brought about that the target will have the desired transmission in the visible range, a certain gray tint or color tone being occasionally desirable and easily obtainable by using the proper type and concentration of the dyes. The undesired diffuse excitation of the fluorescence of the target by the ultraviolet component of sunlight or other external light sources can easily be prevented by means of a film, filter film or filter sheet applied to the side facing away from the laser beam source, which will pass only visible light and will be impermeable to ultraviolet light because it absorbs or reflects it.

The target used in the process of the invention contains preferably fluorescent substances which have an absorption as low as possible and a fluorescence as high as possible in the visible light range. Preferably, fluorescent substances are used which absorb in the ultraviolet light range and yield a fluorescent radiation in the visible light range.

By the selection of suitable dyes, special, frequently needed effects can be achieved. In particular, it can be brought about that a true-color pictorial image can be produced on the target (as known in color television). Fluorescent dyes are used for this purpose, such as rhodamine 6G, coumarine 153 or acridone, and especially dyes on the basis of at least one laser dye molecule described in German Patent Application P 26 55 177.9 of the same Applicant, of Dec. 6, 1976, and containing at least one fluorescent dye molecule moiety whose fluorescence range greatly overlaps the absorption range of the laser dye molecule moiety and is linked directly or by bridging members of no more than 20 Angstroms length with the laser dye molecule moiety such that the π-electron systems of the individual laser dye or fluorescent dye molecule moieties are decoupled.

Advantageously, dyes of the following general Formulas I to VIII are used:

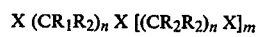 I

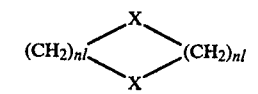 II

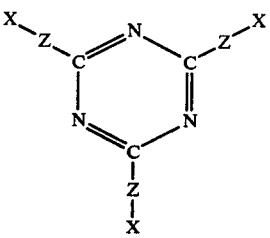 III

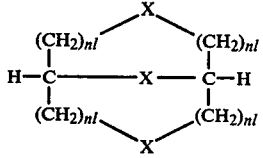 IV

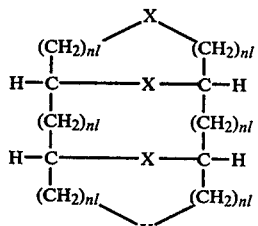 V

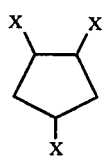 VI

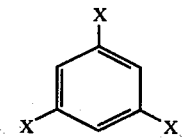 VII

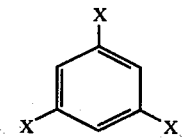

or HC—[(CH$_2$)$_n$X]$_3$     VIII in which formulas, n=0 or a whole number from 1 to a number corresponding to a chain length of 20 Å, n$^1$ is a whole number from 1 to 13, preferably from 1 to 4, m=0, 1, 2 or 3, X is a laser dye molecule moiety L or a fluorescent dye molecule moiety F, Z is an oxygen atom or an NH group, and R$_1$ and R$_2$ are, independently of one another, a hydrogen atom or an alkyl group of 1 to 6 carbon atoms, on the condition that one of the groups X is a moiety L, the moieties F being all identical or different, and the bridge members Cr$_1$R$_2$ being able also to be joined together by oxygen or sulfur atoms.

For the red, green and blue fluorescence of the target, is is also possible to use dyes of the following formulas IX, X and XI, respectively:

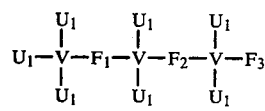 IX

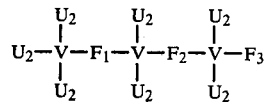 X

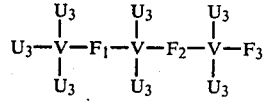 XI in which formulas U$_1$, U$_2$, U$_3$, F$_1$, F$_2$ and F$_3$ represent dye molecule moieties and V represents linking elements, the dye molecule moieties U$_1$, U$_2$ and U$_3$ having a maximum in their longest-wavelength absorption band at the wavelength λ$_1$, λ$_2$ and λ$_3$, respectively, and fluoresce at the wavelength at which the dye molecule moiety F$_1$ absorbs, which in turn fluoresces at the wavelength at which the dye molecule moiety F$_2$ absorbs, which in turn fluoresces at the wavelength at which the dye molecule moiety F$_3$ absorbs.

The above-stated dyes can contain as laser dyes or fluorescent dyes rhodamine K$_1$, rhodamine 6G, rhodamine B, rhodamine S, fluorescein, 2,7-dichlorofluorescein, pyronine, pyrene, fluorene, 9,10-diphenylanthracene, terphenyl, quaterphenyl, 4-methoxyterphenyl or 4,4'''-bis-(alkoxy)-p-quaterphenyl. The linking elements are especially alicyclic rings.

The ultraviolet-absorbing dyes U$_1$, U$_2$ and U$_3$ of the above formulas IX, X and XI, respectively, must be selected such that each dye will have a minimal absorption at the wavelengths of the maximum of the other two dyes. This can easily be achieved, for example, by using cyanine dyes as components U$_1$, U$_2$ and U$_3$. If a point of the target is irradiated with a laser beam of the wavelength λ$_1$, virtually naught but the red fluorescence of the first fluorescent dye will appear at that point, since the absorption at this excitation wavelength is very high for this dye on account of the manifold presence of component U$_1$ in this dye and the minimal absorption of components U$_2$ and U$_3$ plus the low ultraviolet absorption of the dyes F$_1$, F$_2$ and F$_3$. It is thus easily possible to achieve a ratio of the intensity of the desired red fluorescence to that of the green and blue fluorescence (which is not entirely preventable due to the absorption of the other dyes, which does not entirely disappear) of better than 10:1. The same applies to the second dye of the green fluorescence and the third dye of the blue fluorescence.

By an appropriate selection of the wavelengths of the red, green and blue fluorescences, which is determined by the fluorescent dyes $F_1$, $F_2$ and $F_3$, and of the appropriate intensity of the exciting laser beams of the wavelengths $\lambda_1$, $\lambda_2$ and $\lambda_3$, a 100% white saturation is easily achieved. Vice versa, on account of the situation explained above, it is true that a 100% color saturation will not be achieved, but if only one primary color is modulated, the parasitic fluorescences in the other two primary colors will result in a low white saturation which generally is not perceived as undesirable. It need not be stressed that the fluorescent intensities are proportional in each case to the intensity of the exciting laser beams. It is, however, particularly worthy of note that, due to the manifold use of the ultraviolet-absorbing components $U_1$, $U_2$ and $U_3$, the absorption in the ultraviolet range and therefore the utilization of the ultraviolet laser beam can be very high, although the absorption in the visible range is still very low and does not interfere with clear vision through the target.

EXAMPLES

The following examples will serve for the further explanation of the invention.

Example 1

One uses as target an 0.2 mm thick film of polyurethane or of an epoxy resin, into which film rhodamine 6G has been incorporated by polymerization as a dye in a concentration of $10^{-5}$ moles per liter. The incorporation of this dye by polymerization has been described by R. Ulrich and H. P. Weber (Applied Optics 11 [1972] 428). This film still has a transmission of 65% at 530 nm within the main absorption bands in the green range of visible light, and is virtually clearly transparent in the red and blue ranges of visible light. Therefore there is only a faint red tint, which is virtually negligible, in the transparency. At 350 nm in the ultraviolet range there is an absorption of only 5%, but one which is generally quite sufficient to produce an easily visible orange-red fluorescence when the film is excited at a desired point by an ultraviolet laser beam of a wavelength of approximately 350 nm. This monochromatic fluorescence is suitable, for example, for the production of warning signals.

Example 2

One uses as target a $10^{-4} \times$ molar solution of the dye Coumarin 153 (obtainable from Eastman Kodak, Rochester) in ethanol, held in the form of a liquid layer of a thickness of 0.2 mm between two glass sheets. A wavelength of $390 \pm 5$ nm is desirable as the wavelength of the exciting ultaviolet light beam. The result is a very slight, barely perceptible yellow tint in the transparency, while the fluorescence in the green portion of visible light is very strong and can be used, for example, for the production of "go" signals.

Example 3

A film is used which has a thickness of 0.3 mm, made of polyurethane or an epoxy resin, into which the dye acridone is incorporated in a concentration of $5 \times 10^{-4}$ moles per liter. This target film is clearly transparent. Upon excitation with an ultraviolet laser beam of a wavelength between 320 and 360 nm, a strong blue fluorescence is produced, which can be used, for example, for the production of command signals.

Example 4

In order to produce a true-color pictorial representation corresponding to a color television picture, a mixture of dyes in accordance with German patent application No. P 26 55 177.9 of the same applicant is used. In the first fluorescent dye, which produces the red fluorescence, the moiety of the dye 2,5-bis-(5-tert.-butyl-benzoxazole-2-yl)-thiophene is used as the dye molecule moiety $U_1$ of the dye of the above General Formula IX, which is excited by a laser beam of a wavelength of 370 nm. Rhodamine B, for example, can be used as the red fluorescent dye of the dye molecule moiety $F_3$, while one of the dyes specified above and described in German patent application P 26 55 177.9 can be used as dye molecule moieties $F_1$ and $F_2$. The second fluorescent dye used for the production of the green fluorescence, which corresponds to the General Formula X above, contains pterphenyl, for example, as the ultraviolet dye $U_2$, which is excited by an ultraviolet laser beam of a wavelength of 275 nm, where the dye $U_1$ has only a very low absorption. The dye coumarin 153, for example, can be used as the green fluorescent dye of the dye molecule moiety $F_2$. In the case of the third fluorescent dye producing the blue fluorescence, which corresponds to the above General Formula XI, the ultraviolet dye $U_3$ is biphenyl, which is excited by an ultraviolet laser beam of a wavelength of 250 nm, which is a wavelength which is not appreciably absorbed by the dye molecule moieties $U_1$ and $U_2$. The dye acridone can be used as the fluorescent dye molecule moiety $F_1$. These three dyes are all likewise embedded in the plastic film in the manner described in Example 1, a dye concentration of $10^{-5}$ to $10^{31\ 6}$ moles per liter generally sufficing for most applications, because, due to the manifold presence of the ultraviolet dye molecule moieties $U_1$, $U_2$ and $U_3$ in each of these dye molecules, there is an especially high ultraviolet absorption at the modulating wavelengths. Again, a thickness between 0.1 and 0.5 mm is to be selected as the thickness of the target film, according to the desired resolution.

It will be understood that the specification and examples are illustrative but not limitative of the present invention and that other embodiments within the spirit and scope of the invention will suggest themselves to those skilled in the art.

What is claimed is:

1. A display process for the optical presentation of information, which process comprises impinging laser beams modulated as to their direction, intensity and/or frequency, upon a transparent target consisting of a transparent sheet, film, or liquid layer containing ions or dyes capable of fluorescence which is excited by said laser beams to optical fluoresence.

2. Process as claimed in claim 1 wherein the laser beams have a wavelength in the ultraviolet range.

3. Process as claimed in claim 1 wherein the target contains a dye capable of fluorescence.

4. Process as claimed in claim 3 wherein the target contains fluorescent substances which have a lowest possible absorption and a highest possible fluorescence in the visible range of light.

5. Process as claimed in claim 3 wherein the fluorescent substances in the target are ions capable of fluorescense which absorb in the ultraviolet range of light and yield a fluorescent radiation which is in the visible range of light.

6. Process as claimed in claim 5 wherein the target contains rhodamine 6G, coumarin 153 and/or acridone as fluorescent dyes.

7. Process as claimed in claim 6 wherein the target contains as fluorescent dyes one or more dyes on the basis of at least one laser dye molecule, which have at least one fluorescent dye molecule moiety whose range of fluorescence overlaps insofar as possible the absorption range of the laser dye molecule moiety, and which is linked with the dye molecule moiety directly or by bridge members of no more than 20 Å length such that the $\pi$-electron systems of the individual laser dye and of the fluorescent dye molecule moieties are decoupled.

8. Process as claimed in claim 7 wherein the target contains one or more dyes of the following general formulas I to VIII:

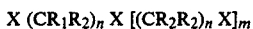   I

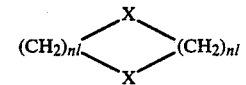   II

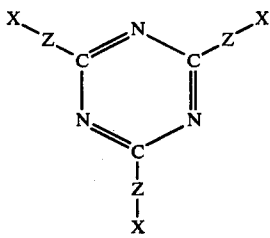   III

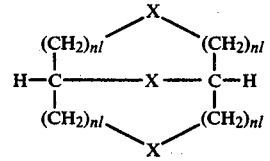   IV

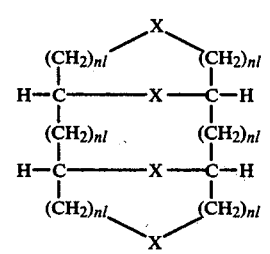   V

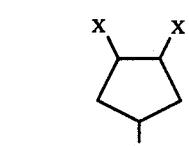   VI

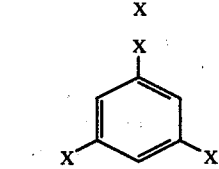   VII

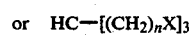   VIII
or $HC-[(CH_2)_nX]_3$ in which formulas, n represents 0 or a whole number from 1 to a number corresponding to a chain length of 20 Å, $n^1$ is a whole number of a value of 1 to 13, m represents 0, 1, 2 or 3, X is laser dye molecule moiety L or a fluorescent dye molecule moety F where all moieties F can be the same or different, provided that one of the groups X represents a laser dye moiety L, Z is an oxygen atom or an NH group, and $R_1$ and $R_2$ represent independently of one another a hydrogen atom or an alkyl group of 1 to 6 carbon atoms, and the members of the moiety $CR_1R_2$ may be joined together by oxygen or sulfur atoms.

9. Process as claimed in claim 8 wherein $n^1$ is an integer from 1 to 4.

10. Process of claim 7 wherein the target contains as red, green and blue fluorescent dyes those of the general formulas IX, X and XI, respectively:

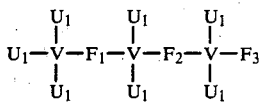   IX

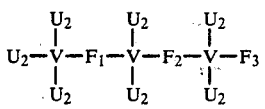   X

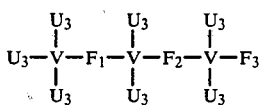   XI in which formulas, $U_1$, $U_2$, $U_3$, $F_1$, $F_2$ and $F_3$ represent dye molecule moieties and V represents linking elements, the dye molecule moieties $U_1$, $U_2$ and $U_3$ having a maximum in their longest-wave absorption band at the wavelengths $\lambda_1$, $\lambda_2$ and $\lambda_3$, respectively, and fluoresce at the wavelength at which the dye molecule moiety $F_1$ absorbs, which in turn fluoresces at the wavelength at which the color molecule moiety $F_2$ absorbs, which in turn fluoresces at the wavelength at which the dye molecule $F_3$ absorbs.

11. Process as claimed in claim 5 wherein the ions capable of fluorescence are uranyl ions or ions of the rare earth elements.

12. Process as claimed in claim 11 wherein the ions capable of fluorescence are lanthan ions.

13. Process as claimed in claim 11 wherein the ions capable of fluorescence are erbium ions.

14. Process as claimed in claim 11 wherein the ions capable of fluorescence are neodymium ions.

15. Process as claimed in claim 11 wherein the ions capable of fluorescence are praesodymium ions.

16. Process as claimed in claim 11 wherein the ions capable of fluorescence are europium ions.

17. Process as claimed in claim 11 wherein the ions capable of fluorescence are cerium ions.

18. Process as claimed in claim 11 wherein the ions capable of fluorescence are terbium ions.

19. Process as claimed in claim 11 wherein the ions capable of fluorescence are samarium ions.

20. Process as claimed in claim 11 wherein the ions capable of fluorescence are gadolinium ions.

21. Process as claimed in claim 1 wherein the target is a plastic film which contains the fluorescent dyes embedded or incorporated by polymerization.

22. Process as claimed in claim 1 wherein the target is a liquid layer containing the fluorescent substances dissolved therein and disposed between two transparent plates.

23. Process as claimed in claim 1 wherein the target bears on the side facing away from the laser beam source a film layer which is transparent to visible light and impermeable to ultraviolet light.

* * * * *